(12) United States Patent
Matsumura et al.

(10) Patent No.: US 11,878,482 B2
(45) Date of Patent: Jan. 23, 2024

(54) TIRE-TRIMMING DEVICE AND METHOD

(71) Applicant: The Yokohama Rubber Co., LTD., Tokyo (JP)

(72) Inventors: Kensuke Matsumura, Hiratsuka (JP); Masayuki Watanabe, Hiratsuka (JP); Haruhisa Hasegawa, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 15/310,092

(22) PCT Filed: May 8, 2015

(86) PCT No.: PCT/JP2015/063334
§ 371 (c)(1),
(2) Date: Nov. 9, 2016

(87) PCT Pub. No.: WO2015/170749
PCT Pub. Date: Nov. 12, 2015

(65) Prior Publication Data
US 2017/0266903 A1 Sep. 21, 2017

(30) Foreign Application Priority Data

May 9, 2014 (JP) .................................. 2014-097994

(51) Int. Cl.
*B29D 30/68* (2006.01)
*B29C 37/02* (2006.01)
(Continued)

(52) U.S. Cl.
CPC .............. *B29D 30/68* (2013.01); *B29C 37/02* (2013.01); *B29D 30/0633* (2013.01); *G01B 21/20* (2013.01)

(58) Field of Classification Search
CPC .... B29D 30/68; B29D 30/0633; B29C 37/02; G01B 21/20
See application file for complete search history.

(56) References Cited

U.S. PATENT DOCUMENTS 2,707,851 A * 5/1955 Strong .................... B24B 5/366
15/21.1
2,986,849 A * 6/1961 Clark ...................... B24B 5/366
15/21.1
(Continued)

FOREIGN PATENT DOCUMENTS

GB           663495 A  * 12/1951 ............. B29D 30/68
JP      H05-215530         8/1993
(Continued)

OTHER PUBLICATIONS

Rodgers, Todd, How to Calculate Speed Based on Wheel Speed & Tire Diameter, Jul. 5, 2019, Robotic Legends, available on Jul. 25, 2022 at : https://roboticlegends.org/buildingtips/drivesystems/how-to-calculate-speed-based-on-wheel-speed-tire-diameter/ (Year: 2019).*
(Continued)

*Primary Examiner* — Jonathan G Riley
(74) *Attorney, Agent, or Firm* — Thorpe North & Western (57) ABSTRACT

Provided are a tire-trimming device and method. The method includes: detecting a profile of a tire outer surface and a position thereof by using a profile sensor while rotating the tire; inputting data detected by the profile sensor into a control unit; when removing the unnecessary rubber components, selecting, from among a plurality of different types of the trimming tool, a trimming tool which is of a type set in the control unit in advance for use in a location on which the unnecessary rubber components are formed; moving the selected trimming tool and the tire relative to one another on the basis of the data detected by the profile
(Continued)

sensor; and positioning a tip end section of the trimming tool along the detected profile of the tire outer surface.

16 Claims, 5 Drawing Sheets

(51) Int. Cl.
    *B29D 30/06*     (2006.01)
    *G01B 21/20*     (2006.01)

(56) References Cited

U.S. PATENT DOCUMENTS

| | | | | |
|---|---|---|---|---|
| 4,059,139 A * | 11/1977 | Nishimoto | | B29C 37/02 157/13 |
| 4,759,638 A * | 7/1988 | McLaughlin | | B60B 15/22 301/43 |
| 4,934,185 A * | 6/1990 | Nishiyama | | G01N 3/24 73/150 A |
| 5,005,628 A * | 4/1991 | Kinuhata | | B29D 30/68 157/13 |
| 5,065,804 A * | 11/1991 | Kinuhata | | B23D 35/008 157/13 |
| 5,193,600 A * | 3/1993 | Kinuhata | | B29D 30/68 157/13 |
| 5,974,643 A * | 11/1999 | Hays | | B23Q 17/2233 29/39 |
| 8,186,254 B2 * | 5/2012 | Nonaka | | B25J 15/04 156/510 |
| 2002/0035908 A1 * | 3/2002 | Kawashima | | B29D 30/68 83/368 |
| 2004/0074292 A1 * | 4/2004 | Irwin | | B23C 3/00 73/146 |
| 2008/0218742 A1 | 9/2008 | Sakoda et al. | | |
| 2009/0077806 A1 * | 3/2009 | Allen | | B60C 25/00 29/894.31 |
| 2010/0084211 A1 * | 4/2010 | Seidel | | B60L 58/21 180/65.265 |
| 2011/0143637 A1 * | 6/2011 | Miyamoto | | B24B 5/366 451/5 |
| 2011/0214801 A1 * | 9/2011 | Lindsay | | B29D 30/54 156/96 |
| 2014/0283591 A1 * | 9/2014 | Takahashi | | G01B 11/245 73/146 |
| 2015/0174842 A1 * | 6/2015 | Pialot, Jr. | | B29D 30/52 264/479 |

FOREIGN PATENT DOCUMENTS

| | | | | |
|---|---|---|---|---|
| JP | H10-296877 | | | 11/1998 |
| JP | H10-315348 | | | 12/1998 |
| JP | 2001150567 | A | * | 6/2001 |
| JP | 2002-350126 | | | 12/2002 |
| JP | 2004-299184 | | | 10/2004 |
| JP | 2008-126479 | | | 6/2008 |
| JP | 2008-221896 | | | 9/2008 |

OTHER PUBLICATIONS

International Search Report for International Application No. PCT/JP2015/063334 dated Jun. 23, 2015, Japan, 4 pages.

\* cited by examiner

TIRE-TRIMMING DEVICE AND METHOD

TECHNICAL FIELD

The present technology relates to a tire-trimming device and method, and more specifically, relates to a tire-trimming device and method which make it possible to more efficiently and cleanly remove unnecessary rubber components formed on a tire surface when vulcanizing the tire, without performing a complicated control procedure.

BACKGROUND ART

When a tire is vulcanized, there are cases in which spew that is formed by the curing of unvulcanized rubber that has entered into a vent hole of a mold, or a thin rubber film that is formed by the curing of unvulcanized rubber that has overflowed from a joint of the mold are present on the tire surface. Conventionally, various trimming devices and methods have been proposed for cutting away spew on the tire surface (see Japanese Unexamined Patent Application Publication No. H10-296877A, for example).

In a trimming method disclosed in Japanese Unexamined Patent Application Publication No. H10-296877A, an image including a profile of a tread portion of the tire is captured from a tread side, and image data of the tire is acquired. The spew on the tire is identified on the basis of this image data, a blade tip of a spew cutter is positioned along a base of the spew, and the spew is cut off. In actuality, this trimming method substantially only targets and cuts off spew formed on a land portion of the tread, and uses one type of spew cutter for the trimming.

However, a form (the thickness, length, tilt, and shape) of the spew formed on the vulcanized tire is not uniform and differs depending on a portion of the tire surface. As a result, since a specification of an optimal cutter used to cut off the respective types of spew differs, it is difficult to cleanly cut off all of the spew with the one type of cutter. Further, a thin rubber film formed on a portion corresponding to a joint of a mold cannot be removed using the cutter used to cut off the spew formed on the land portion.

SUMMARY

The present technology provides a tire-trimming device and method capable of efficiently and cleanly removing unnecessary rubber components formed on a tire surface when vulcanizing the tire, without performing a complicated control procedure.

A tire-trimming device of the present technology is provided with a rotation mechanism to rotate a tire and a trimming tool positioned on a tire outer surface of the tire. The tire-trimming device removes unnecessary rubber components formed on the tire outer surface when vulcanizing the tire, using the trimming tool while the tire is being rotated by the rotation mechanism, and includes: a plurality of different types of the trimming tool; a profile sensor detecting, while the tire is being rotated by the rotation mechanism, a profile of a tire width direction cross section of the tire outer surface and a position thereof; a control unit into which detection data detected by the profile sensor is input; and a movement mechanism causing the trimming tool and the tire to move relative to one another. The type of the trimming tool to be used according to a portion of the tire outer surface is set in advance in the control unit and when the unnecessary rubber components are removed, the type of the trimming tool set in advance for use on the portion on which the unnecessary rubber components are formed is selected, and, by a movement of the movement mechanism being controlled by the control unit on the basis of the detection data, a tip end section of the selected trimming tool is positioned along the profile detected by the profile sensor and removes the unnecessary rubber components.

A tire-trimming method of the present technology removes unnecessary rubber components formed on a tire outer surface when vulcanizing the tire, using a trimming tool while rotating the tire. The tire-trimming method includes the steps of: detecting, using a profile sensor, a profile of a tire width direction cross section of a tire outer surface and a position thereof, while the tire is being rotated; inputting data detected by the profile sensor into a control unit; setting in advance, in the control unit, a type of the trimming tool to be used according to a portion of the tire outer surface; selecting, from among a plurality of different types of the trimming tool, the trimming tool set in advance to be used on the portion on which the unnecessary rubber components are formed, when removing the unnecessary rubber components; controlling a movement of a movement mechanism, using the control unit, on the basis of detection data detected by the profile sensor; moving the selected trimming tool and the tire relative to one another; positioning a tip end section of the selected trimming tool along the profile detected by the profile sensor; and removing the unnecessary rubber components.

According to the present technology, a profile of a tire width direction cross section of a tire outer surface and a position thereof are detected using a profile sensor while rotating the tire, the trimming tool and the tire are moved relative to one another on the basis of data detected by the profile sensor, and a tip end section of the trimming tool is positioned along the profile detected by the profile sensor. Specifically, when trimming the tire, the profile of the tire width direction cross section of the tire outer surface and the position thereof are ascertained, and therefore, there is no need to prepare in advance profile data of the tire to be trimmed and no need to perform an operation in advance to teach a control device a range over which trimming is to be performed. Thus, man-hours required for the trimming operation can be reduced. Further, because the profile of each tire differs slightly, even with a tire of the same specification, detecting the profile and the position thereof of the tire to be trimmed is advantageous for cleanly removing unnecessary rubber components.

In addition, a type of the trimming tool to be used according to a portion of the tire outer surface is set in advance in a control unit, and, when removing the unnecessary rubber components, the type of the trimming tool set in advance for use on the portion on which the unnecessary rubber components are formed is selected from among a plurality of the different types of the trimming tools, and is used. Thus, the optimum trimming tool for removing those unnecessary rubber components is used. This is thus even more advantageous for cleanly removing the respective unnecessary rubber components.

Furthermore, because the profile and the position thereof are detected by the profile sensor while rotating the tire, the profile alone is easily detected, without detecting the unnecessary rubber components formed on the tire outer surface. Then, without identifying the location or the like of the unnecessary rubber components, the tip end section of the selected trimming tool is positioned along the detected profile, and the tire is rotated. As a result, the unnecessary rubber components can be cleanly removed without performing a complicated control procedure. In this way, as a result of achieving synergistic effects by combining all the above-described configurations, the present technology makes it possible to more efficiently and cleanly remove the unnecessary rubber components without performing a complicated control procedure, which is required conventionally.

DETAILED DESCRIPTION

A tire-trimming device and method of the present technology will be described below with reference to an embodiment illustrated in the drawings.

Figure 1:
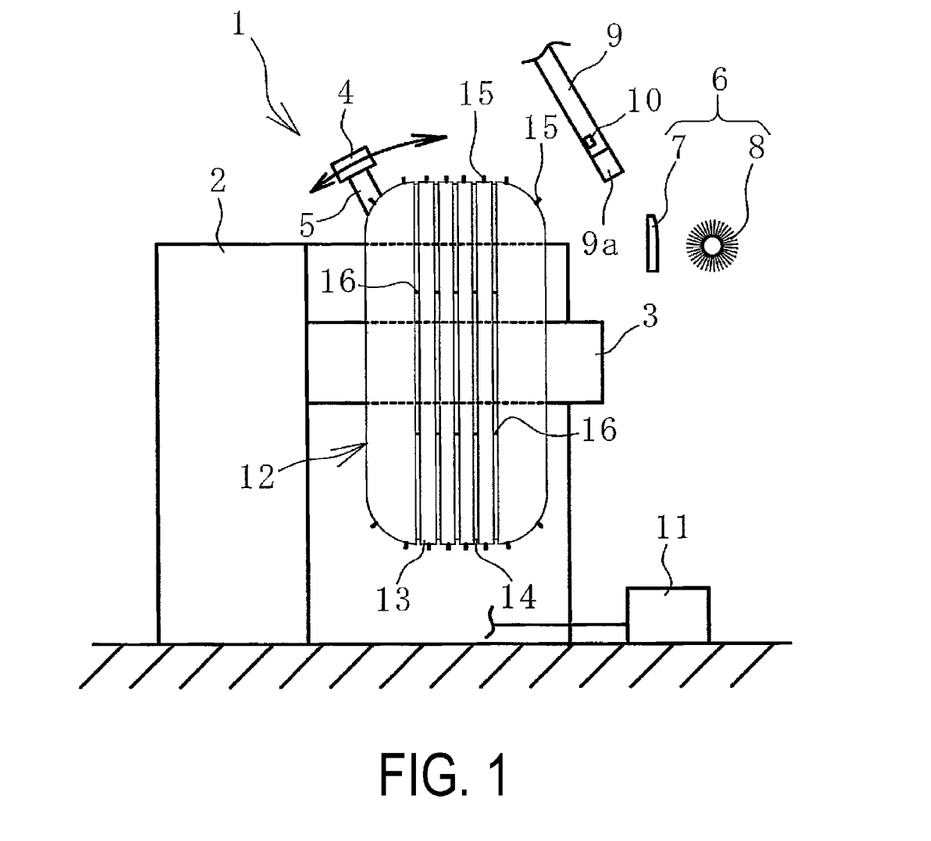
FIG. 1 is an explanatory view illustrating a tire-trimming device of the present technology.

A tire-trimming device 1 of the present technology illustrated in FIG. 1 removes unnecessary rubber components formed on a tire outer surface when vulcanizing the tire. The unnecessary rubber components that are targeted for removal are spew 15 formed on a land portion 13, and a thin rubber film 16 formed on a groove portion 14.

The tire-trimming device 1 is provided with a rotating shaft 3 that is a rotation mechanism causing a tire 12 to rotate, a trimming tool 6 positioned on the tire outer surface of the tire 12, a profile sensor 4, a control unit 11 into which detection data detected by the profile sensor 4 is input, and a movement mechanism 9 that moves the trimming tool 6 and the tire 12 relative to one another. In the present embodiment, the movement mechanism 9 is formed by a trimming tool arm 9 that moves freely in three dimensions. For example, an arm of an industrial robot can be used as the movement mechanism 9. Movement of the trimming tool arm 9 is controlled by the control unit 11.

The rotating shaft 3 extends in the horizontal direction from a support body 2 provided standing on the ground. The tire 12 is, for example, assembled on a rim, and is attached to the rotating shaft 3 by this rim being fixed to the rotating shaft 3. The rotating shaft 3 is configured such that it can be adjusted to a given rotation speed by the control unit 11. The rotation speed is, for example, a peripheral speed of the outer circumferential surface of the tire 12 that is 30 mm/sec or greater and 4,000 mm/sec or less.

The profile sensor 4 detects a profile of a tire width direction cross section of the tire outer surface, and a position thereof. An optical sensor used for optical cutting measurement or image processing is used as the profile sensor 4, for example. In the present embodiment, the profile sensor 4 is attached to a second end of a sensor arm 5, whose first end is rotatably attached to the support body 2.

A holding portion 9a, which holds the trimming tool 6, is provided on a tip end section of the trimming tool arm 9. Further, a pressure sensor 10 is provided on the trimming tool arm 9. The pressure sensor 10 successively detects a pressure with which the trimming tool 6 presses the tire outer surface. Data detected by the pressure sensor 10 is input into the control unit 11.

The trimming device 1 has a plurality of different types of the trimming tool 6. In the present embodiment, the trimming device 1 has two types of the trimming tool 6, namely, a cutter 7 and a rotating brush 8. The trimming tool 6 is not limited to the two types and can be three types or more. Further, a plurality of types of the trimming tool 6 can be created by causing the blade length and the blade bending rigidity of the cutter 7 to be different. Of the plurality of types of the trimming tool 6, one trimming tool 6 is selected and held by the holding portion 9a of the trimming tool arm 9.

The type of the trimming tool 6 to be used in accordance with a portion of the tire outer surface is input and set in the control unit 11 in advance. For example, the cutter 7 adopted as the trimming tool 6 used for the land portion 13 of the tire outer surface, and the rotating brush 8 adopted as the trimming tool 6 used for the groove portion 14 are each set in the control unit 11 in advance.

Next, an example will be described of a procedure of a tire-trimming method of the present technology.

Figure 2:
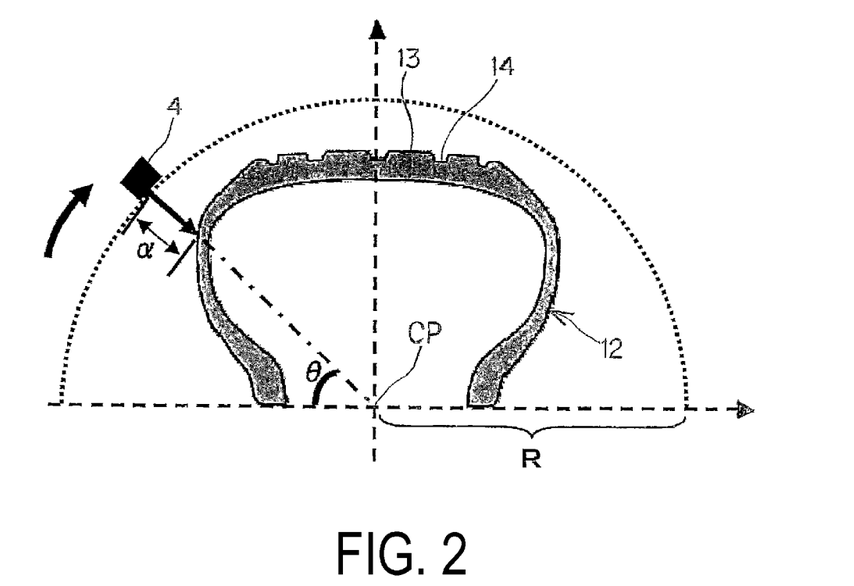
FIG. 2 is an explanatory view illustrating, in a cross-section view, a process of detecting a profile of a tire outer surface in a tire width direction.

First, the profile of the tire 12 to be trimmed is ascertained. Here, while rotating the tire 12 by driving the rotating shaft 3 to rotate, the profile of the tire width direction cross section of the tire outer surface and the position thereof are detected by the profile sensor 4. Specifically, as illustrated in FIG. 2, the profile sensor 4 is moved in the tire width direction along the outer surface of the rotating tire 12, by a constant radius R around a center CP as the center of rotation of the tire 12.

In this process, a rotation angle $\theta$ of the profile sensor 4 that is caused to move and a distance a from the profile sensor 4 to the tire outer surface are detected. As a result of this process, data illustrated in FIG. 3 ($\theta$-$\alpha$ coordinate data) is acquired, and this detection data is input into the control unit 11.

Figure 3:
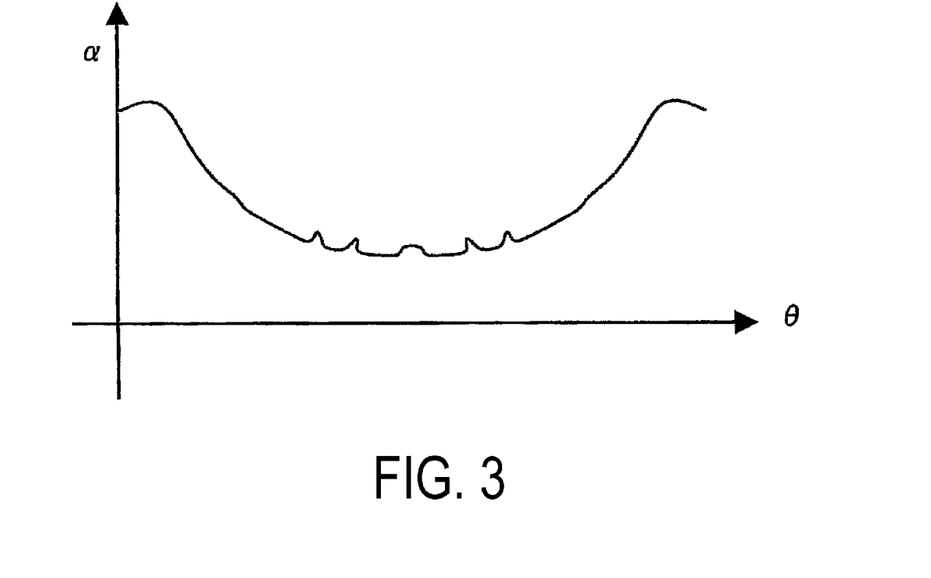
FIG. 3 is an explanatory view illustrating detected profile data.
Figure 4:
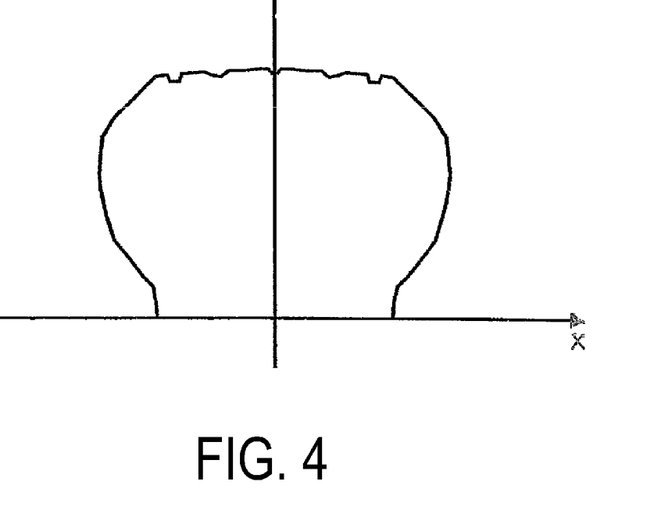
FIG. 4 is an explanatory view illustrating data obtained by converting the data in FIG. 3 to a tire outer surface position.

In the control unit 11, a calculation is performed to convert the data illustrated in FIG. 3 to a tire outer surface position (coordinates at which an actual tire T is placed). As a result of this calculation, data (X-Y coordinate data) illustrated in FIG. 4 is obtained. When removing the unnecessary rubber components 15 and 16 formed on the tire outer surface, the trimming tool arm 9 (the trimming tool 6) is moved on the basis of the data illustrated in FIG. 4.

The unnecessary rubber components 15 and 16 are removed using the selected trimming tool 6 while the tire 12 is being rotated. The movement of the trimming tool arm 9 is controlled by the control unit 11 on the basis of the detection data detected by the profile sensor 4, and the selected trimming tool 6 and the tire 12 are moved relative to one another. In the present embodiment, the rotating tire 12 is fixed in a certain position, and thus, the trimming tool 6 is caused to move and the tip end section of the trimming tool 6 is positioned along the profile detected by the profile sensor 4.

Figure 5:
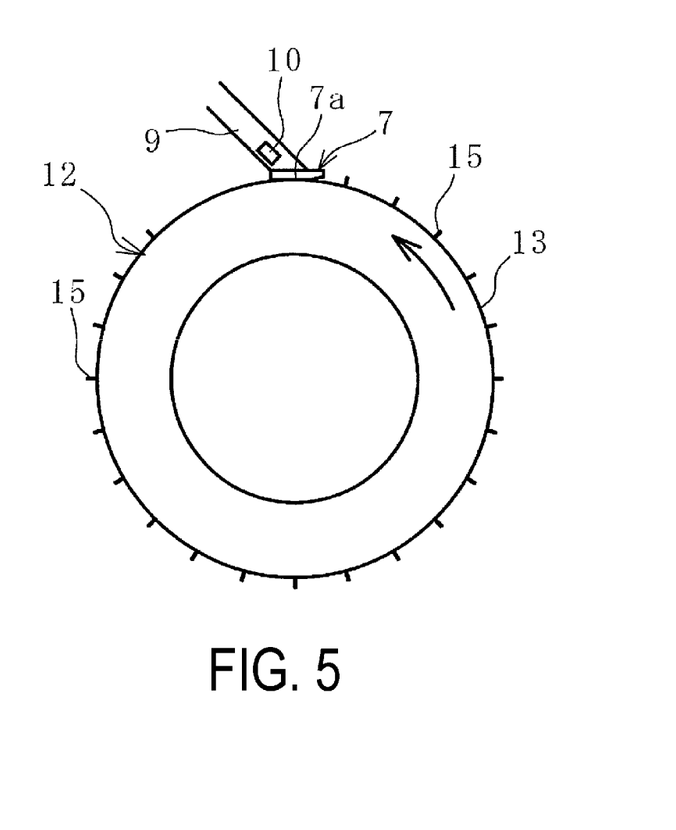
FIG. 5 is an explanatory view illustrating, in a tire side view, a process of removing spew formed on a land portion of the tire outer surface.

For example, when removing the spew 15 formed on the land portion 13, the cutter 7 is selected and held by the holding portion 9a, as illustrated in FIG. 5. The thickness of the spew 15 has an outer diameter of 1 mm or greater and 2 mm or less, and a length of 5 mm or greater and 10 mm or less. Then, the movement of the trimming tool arm 9 is controlled by the control unit 11 on the basis of the detection data detected by the profile sensor 4 (the data illustrated in FIG. 4). In this way, a cutter tip end section 7a of the selected cutter 7 is positioned along the profile (the shape illustrated in FIG. 4) detected by the profile sensor 4. Specifically, the cutter tip end section 7a is positioned so as to extend along the direction of a tangent line of the tire outer surface, in a tire side view.

Since the tire 12 is rotating, the spew 15 is removed by the cutter 7. As a result of the cutter 7 being moved by the trimming tool arm 9 in the tire width direction along the profile detected by the profile sensor 4, all of the spew 15 formed on the land portion 13 is removed.

In the present embodiment, the cutter 7 is moved by the trimming tool arm 9 on the basis of pressure data detected by the pressure sensor 10, and the pressure detected by the pressure sensor 10 is maintained within an allowable pressure range. Specifically, if this pressure is excessively large, unnecessary damage may be caused to the tire outer surface by the cutter 7. On the other hand, if this pressure is excessively small, insufficient removal may occur in which the spew 15 cannot be removed from the base. Further, the detection data detected by the profile sensor 4 (the data illustrated in FIG. 3 and FIG. 4) is average value data of the whole circumference in the tire circumferential direction. Thus, in the actual tire 12, due to the position in the tire circumferential direction, slight variations occur in the profile and the position thereof with respect to this detection data. Thus, the allowable pressure range is determined in advance, and the cutter 7 is moved so as to maintain this range.

Figure 6:
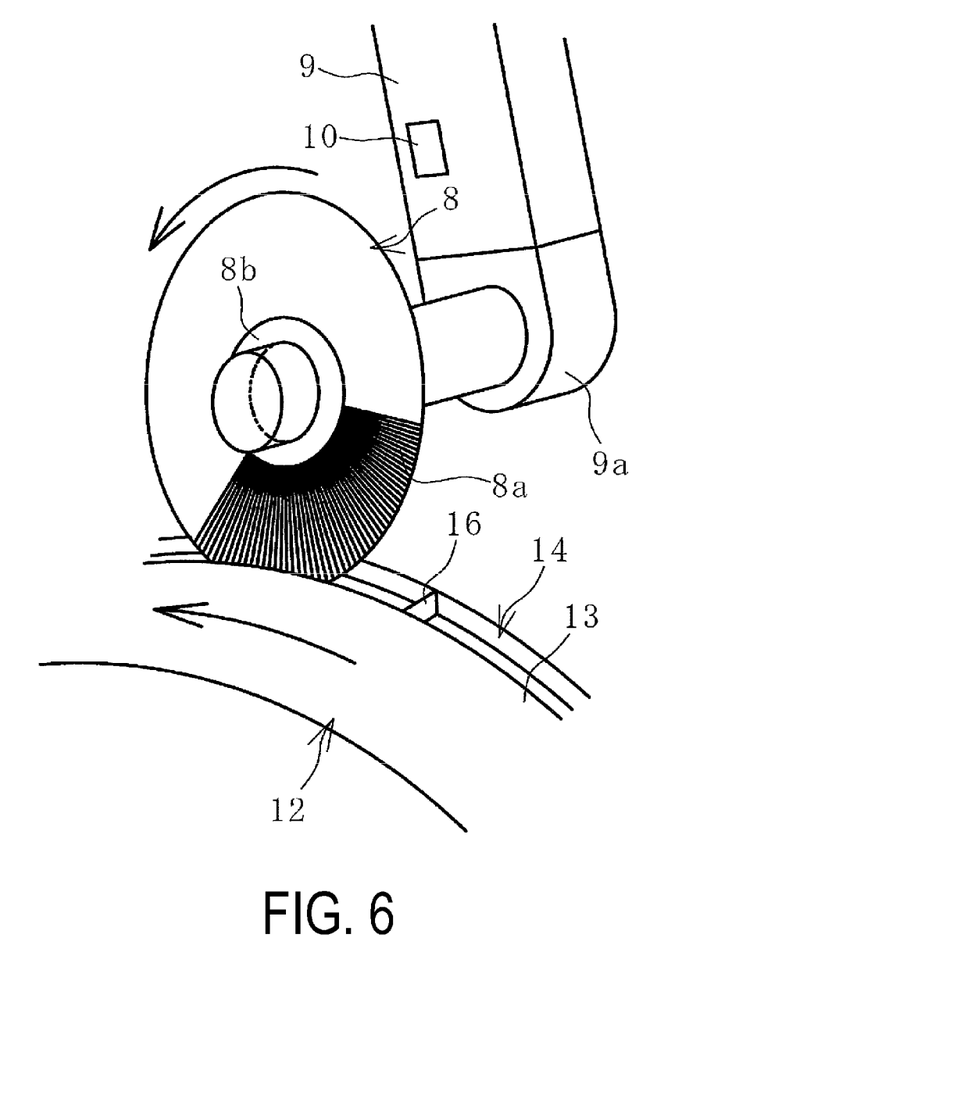
FIG. 6 is an explanatory view illustrating, in a perspective view, a process of removing a thin rubber film formed on a groove portion of the tire outer surface.

When removing the thin rubber film 16 formed on the groove portion 14, the rotating brush 8 is selected and held by the holding portion 9a, as illustrated in FIG. 6. The thickness of the rubber film 16 is 1 mm or less (approximately 0.2 mm or greater and 0.8 mm or less), for example. The rotating brush 8 is configured by many non-metallic fiber-shaped bodies 8a detachably attached to a rotating spindle via a core 8b. The fiber-shaped bodies 8a extend radially from the core 8b in the radial direction, and the diameter thereof is set to less than 1 mm (0.3 mm or greater and 0.8 mm or less), for example. 6-6 nylon or 6-12 nylon based fibers are used as the fiber-shaped bodies 8a, for example. Note that, in FIG. 6, the illustration omits some of the fiber-shaped bodies 8a.

Figure 7:
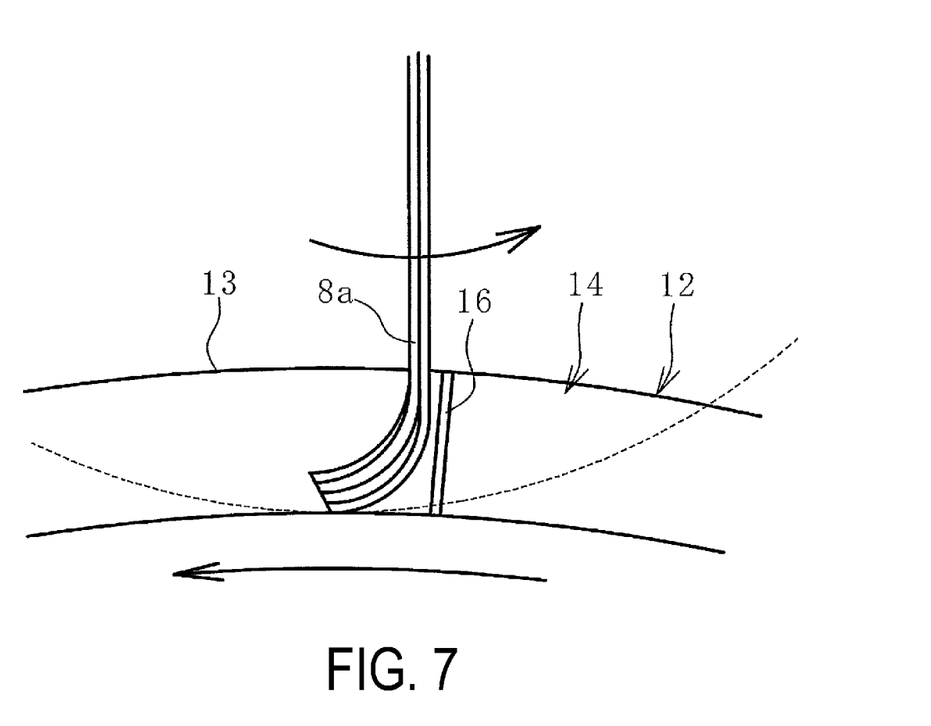
FIG. 7 is an explanatory view illustrating, in an enlarged tire side view, the process in FIG. 6.

Then, the movement of the trimming tool arm 9 is controlled by the control unit 11 on the basis of the detection data detected by the profile sensor 4 (the data illustrated in FIG. 4). In this way, tip end sections of the fiber-shaped bodies 8a of the selected rotating brush 8 are positioned along the profile (the shape illustrated in FIG. 4) detected by the profile sensor 4. Specifically, as illustrated in FIG. 7, the tip end sections of the fiber-shaped bodies 8a are positioned so as to come into contact with a bottom surface of the groove portion 14.

In this way, in the groove portion 14, the tip end sections of the plurality of fiber-shaped bodies 8a of the rotating brush 8 that is rotating come into contact with the whole section of the rubber film 16, and the rubber film 16 is instantly separated from both side surfaces and the bottom surface of the groove portion 14, and is cleanly removed. The rotation direction of the tire 12 and the rotation direction of the rotating brush 8 are set to be the same direction. A rate of rotation of the rotating brush 8 is approximately 10,000 rpm (8,000 rpm or greater and 12,000 rpm or less, for example.

Because the tire 12 is rotating, the rubber film 16 formed on the groove portion 14 extending in the circumferential direction is successively removed in a similar manner. In this case also, the rotating brush 8 may be moved on the basis of the pressure data detected by the pressure sensor 10, and the pressure detected by the pressure sensor 10 may be maintained within the allowable pressure range.

Abrasive grains can also be mixed in with the fiber-shaped bodies 8a in advance. Aluminum oxide, silicon carbide and the like are used as the abrasive grains, for example, and the content by weight thereof is approximately 20% or greater and 40% or less. By mixing in the abrasive grains, the rubber film 16 is likely to be even more efficiently and cleanly removed.

According to the present technology, as described above, when trimming the tire 12, the profile of the tire width direction cross section of the tire outer surface and the position thereof are ascertained, and therefore, there is no need to prepare in advance profile data of the tire 12 to be trimmed and no need to perform an operation in advance to teach a control device the range over which trimming is to be performed. Thus, man-hours required for the trimming operation is reduced. Further, because the unique profile and the position thereof of each tire to be trimmed are detected, this is advantageous to cleanly remove the unnecessary rubber components 15 and 16.

In addition, because the type of the trimming tool 6 appropriate to be used for each portion of the tire outer surface is set in advance in the control unit 11, the spew 15 and the rubber film 16 can each be cleanly removed.

Furthermore, because the profile and the position thereof are detected by the profile sensor 4 while rotating the tire 12, the profile alone is easily detected, without detecting the spew 15 and the rubber film 16 that are formed intermittently in the circumferential direction on the tire outer surface.

When the profile sensor 4 detects the profile of the tire width direction cross section of the tire outer surface and the position thereof, if the rotation speed (the peripheral speed of the outer circumferential surface) of the tire 12 is accelerated, the unnecessary rubber components 15 and 16 formed intermittently in the circumferential direction on the tire outer surface are not easily detected, and the profile alone is easily detected by eliminating the unnecessary rubber components 15 and 16 from the detection data. Thus, the peripheral speed of the outer circumferential surface of the tire 12 at the time of the detection may be set to be a higher speed than the peripheral speed of the outer circumferential surface of the tire 12 when the unnecessary rubber components 15 and 16 are removed by the trimming tool 6. The peripheral speed of the outer circumferential surface of the tire 12 when detecting the profile is 200 mm/sec or greater and 4,000 mm/sec or less, for example, and the peripheral speed of the outer circumferential surface of the tire 12 when removing the unnecessary rubber components 15 and 16 is 30 mm/sec or greater and 2,000 mm/sec or less, for example.

Further, because the tire 12 is rotated while the tip end section of the selected trimming tool 6 is positioned along the detected profile, without identifying the locations at which the spew 15 and the rubber film 16 exist and the like, the spew 15 and the rubber film 16 can be cleanly removed without performing a complicated control procedure. According to the present technology, in this manner, in comparison to conventional techniques, the spew 15 and the rubber film 16 can be more efficiently and cleanly removed, without performing a complicated control procedure.

In the above-described embodiment, the configuration is adopted in which the tire 12 is fixed in a predetermined position (the support body 2) and rotates, and at the same time, the trimming tool 6 is moved in the tire width direction and removes the spew 15 and the thin rubber film 16. However, it is sufficient that the tire 12 and the trimming tool 6 move relative to one another. Specifically, a configuration can be adopted in which the trimming tool 6 is fixed in a predetermined position, and the tire 12 is moved in the tire width direction while being rotated, thereby removing the spew 15 and the thin rubber film 16. For example, the trimming tool 6 is fixed in the predetermined position of the support body 2, and the rotating shaft 3 to which the tire 12 is attached can be moved by the movement mechanism 9.

After the process to remove the unnecessary rubber components 15 and 16 is complete, the profile sensor 4 can also check whether the unnecessary rubber components 15 and 16 have been cleanly removed. In this case, the profile of the tire width direction cross section of the outer surface of the tire 12 after the removal process is detected while making the peripheral speed slower than the peripheral speed of the outer circumferential surface of the tire 12 when the profile is detected by the profile sensor 4 before the removal of the unnecessary rubber components 15 and 16. Specifically, the peripheral speed of the outer circumferential surface of the tire 12 is slowed to a level at which the unnecessary rubber components 15 and 16 can be detected. Then, by comparing this detected data with the profile data (the data illustrated in FIG. 3 or FIG. 4) before the removal process, a state of removal of the unnecessary rubber components 15 and 16 can be verified.

The invention claimed is:

1. A tire-trimming device provided with a rotation mechanism to rotate a tire and a trimming tool positioned on a tire outer surface of the tire, for removing, using the trimming tool while the tire is being rotated by the rotation mechanism, unnecessary rubber components formed on the tire outer surface when vulcanizing the tire, the unnecessary rubber components being spew or a thin rubber film formed on a portion corresponding to a joint of a mold, the tire-trimming tool comprising:
   a plurality of different types of the trimming tool;
   a profile sensor configured to detect, while the tire is being rotated by the rotation mechanism, a profile of a tire width direction cross section of the tire outer surface and a position thereof, the profile sensor being further configured to detect the profile while the profile sensor is rotated in the tire width direction at a constant radius from a center of rotation of the tire;
   a control unit into which detection data detected by the profile sensor is input;
   a movement mechanism causing at least one selected from the trimming tool and the tire to move relative to another of the at least one selected from the trimming tool and the tire, wherein the control unit is configured to set in advance the type of the trimming tool to be used according to a portion of the tire outer surface and when the unnecessary rubber components are removed, the control unit is further configured to set in advance the type of the trimming tool for use on the portion on which the unnecessary rubber components are formed is selected, and, the control unit is configured to control a movement of the movement mechanism on the basis of the detection data to position a tip end section of the selected trimming tool along the profile detected by the profile sensor and remove the unnecessary rubber components; and
   a pressure sensor successively detecting a pressure with which the selected trimming tool presses the tire outer surface, wherein pressure data detected by the pressure sensor is input into the control unit, the selected trimming tool and the tire are caused to move relative to one another by the movement mechanism on the basis of the pressure data detected by the pressure sensor, and the pressure detected by the pressure sensor is maintained within an allowable pressure range.

2. The tire-trimming device according to claim 1, wherein the control unit is configured to set a cutter in advance as the trimming tool to be used on a land portion of the tire outer surface, and the control unit is further configured to set a rotating brush in advance as the trimming tool to be used on a groove portion of the tire outer surface.

3. The tire-trimming device according to claim 1, wherein the control unit is configured to set a peripheral speed of the tire outer surface when detecting the profile and the position thereof using the profile sensor to be a higher speed than a peripheral speed of the tire outer surface when removing the unnecessary rubber components using the selected trimming tool.

4. The tire-trimming device according to claim 1, wherein as well as the tire rotating while being fixed in a predetermined position, the selected trimming tool removes the unnecessary rubber components while being moved in a tire width direction.

5. The tire-trimming device according to claim 1, wherein as well as the selected trimming tool being fixed in a predetermined position, the tire is moved in a tire width direction while being rotated, and the unnecessary rubber components are removed.

6. The tire-trimming device according to claim 1, wherein the profile sensor is configured to detect a rotation angle of the profile sensor as it rotates around the center of rotation of the tire in the tire width direction and to detect a distance of the profile sensor to the tire as the detection data, and the control unit is configured to convert coordinates of the rotation angle and the distance to linear coordinates representing tire outer surface positions as the profile.

7. The tire-trimming device according to claim 1, wherein the profile of the tire includes an entirety of sidewalls of the tire.

8. The tire-trimming device according to claim 1, wherein the profile sensor is further configured to detect he profile after the unnecessary rubber components are removed and to compare the profile before and after the removal of the unnecessary rubber components, thereby verifying a state of removal of the unnecessary rubber components.

9. A tire-trimming method for removing unnecessary rubber components formed on a tire outer surface when vulcanizing the tire, using a trimming tool while rotating the tire, the unnecessary rubber components being spew or a thin rubber film formed on a portion corresponding to a joint of a mold, the tire-trimming method comprising the steps of:
   detecting, using a profile sensor, a profile of a tire width direction cross section of the tire outer surface and a position thereof, while the tire is being rotated and while the profile sensor is rotated in the tire width direction at a constant radius from a center of rotation of the tire;
   inputting data detected by the profile sensor into a control unit;
   setting in advance, in the control unit, a type of the trimming tool to be used according to a portion of the tire outer surface; selecting, from among a plurality of different types of the trimming tool, the trimming tool set in advance to be used on the portion on which the unnecessary rubber components are formed, when removing the unnecessary rubber components;

controlling a movement of a movement mechanism, using the control unit, on the basis of detection data detected by the profile sensor;

successively detecting a pressure, using a pressure sensor, with which the selected trimming tool presses the tire outer surface, wherein the selected trimming tool and the tire are caused to move relative to one another by controlling the movement of the movement mechanism, using the control unit, on the basis of pressure data detected by the pressure sensor, and the pressure detected by the pressure sensor is maintained within an allowable pressure range;

moving the selected trimming tool and the tire relative to one another;

positioning a tip end section of the selected trimming tool along the profile detected by the profile sensor; and removing the unnecessary rubber components.

10. The tire-trimming method according to claim 9, wherein a cutter is set in advance as the trimming tool to be used on a land portion of the tire outer surface, and a rotating brush is set in advance as the trimming tool to be used on a groove portion of the tire outer surface.

11. The tire-trimming method according to claim 9, wherein a peripheral speed of the tire outer surface when detecting the profile and the position thereof using the profile sensor is set to be higher than a peripheral speed of the tire outer surface when removing the unnecessary rubber components using the selected trimming tool.

12. The tire-trimming method according to claim 9, wherein as well as the tire being fixed in a predetermined position and being rotated, the selected trimming tool removes the unnecessary rubber components while being moved in a tire width direction.

13. The tire-trimming method according to claim 9, wherein as well as the selected trimming tool being fixed in a predetermined position, the tire is moved in a tire width direction while being rotated, and the unnecessary rubber components are removed.

14. The tire-trimming method according to claim 9, further comprising: detecting a rotation angle of the profile sensor as it rotates around the center of rotation of the tire in the tire width direction and detecting a distance of the profile sensor to the tire as the detection data, and converting coordinates of the rotation angle and the distance to linear coordinates representing tire outer surface positions as the profile.

15. The tire-trimming method according to claim 9, wherein the profile of the tire includes an entirety of sidewalls of the tire.

16. The tire-trimming method according to claim 9, further comprising detecting, using the profile sensor, the profile after the unnecessary rubber components are removed, and comparing the profile before and after the removal of the unnecessary rubber components to verify a state of removal of the unnecessary rubber components.

* * * * *